Nov. 24, 1942.  F. W. BURGER  2,303,255
BRAKES FOR DUAL WHEELS
Filed April 6, 1940
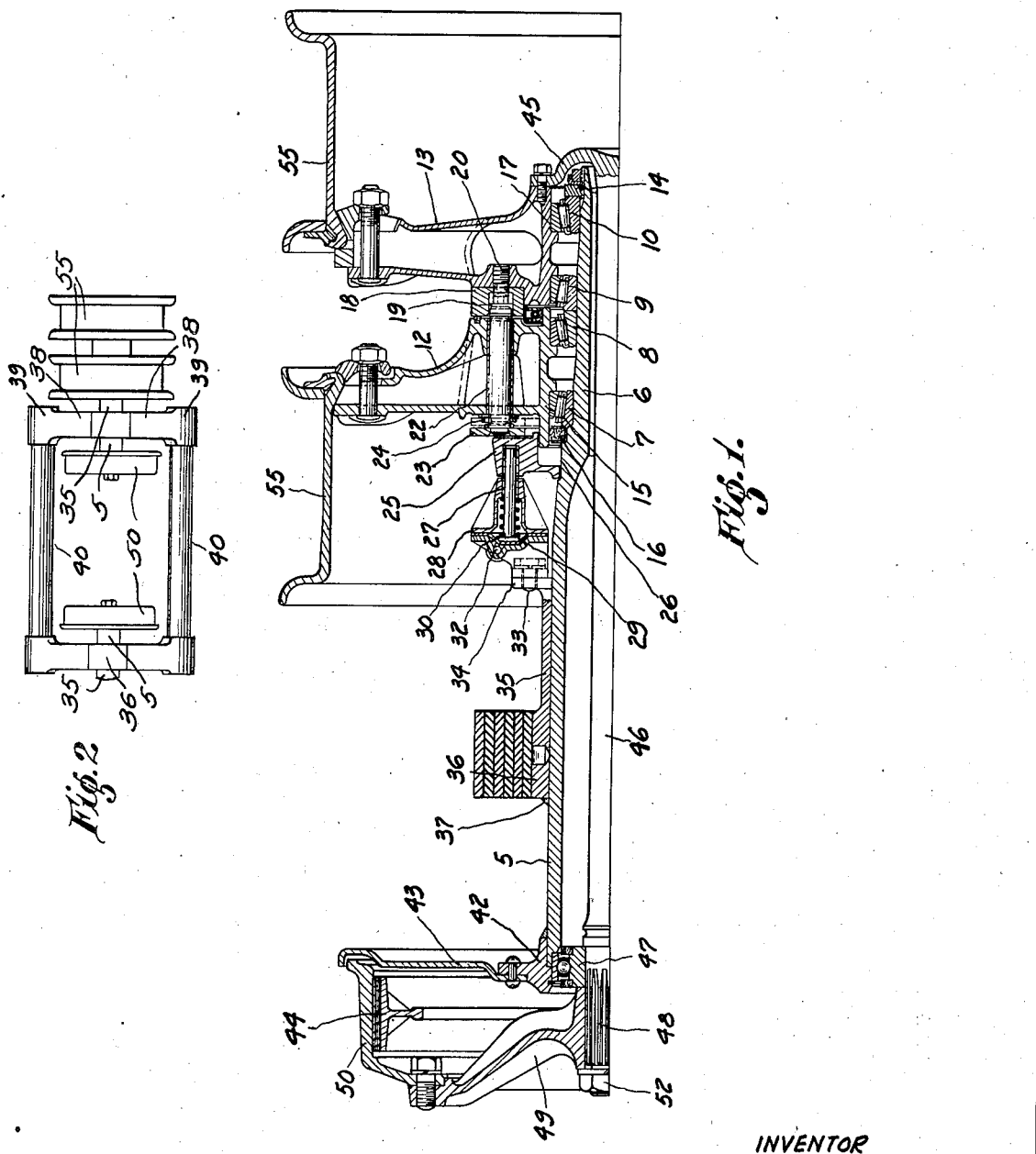
INVENTOR
FREDERICK W. BURGER
BY Walter E. Schirmer
ATTORNEY Patented Nov. 24, 1942

2,303,255

UNITED STATES PATENT OFFICE 2,303,255

BRAKE FOR DUAL WHEELS

Frederick W. Burger, Niles, Mich., assignor to Clark Equipment Company, Buchanan, Mich., a corporation of Michigan Application April 6, 1940, Serial No. 328,178

11 Claims. (Cl. 188—18)

This invention relates to wheels, and more particularly is concerned with a dual wheel construction of the free rolling type to be employed in trailer axles in which no drive is transmitted through the axle.

The present application is a modification of an improvement over the construction shown in my copending application, Serial No. 268,174, filed April 17, 1939, Patent No. 2,260,828, issued October 28, 1941.

Broadly considered, the present invention contemplates a dual wheel assembly for trucks and trailers in which the wheels are so arranged as to have relative rotation to eliminate tire scuffing when turning the truck or trailer caused by the difference in turning radii.

In the present construction, the tire rims are carried on separate wheel bodies rotatably mounted on an axle spindle or arm which provides for relative rotation of the wheels when the vehicle is turned in either direction.

One of the primary objects of the present invention is to provide a dual wheel construction of this type having means operable for locking the two wheels together so that both tires will have braking reaction applied thereto when the brake system is actuated.

In this connection, a distinct advantage of the present construction is the provision of a brake drum and braking means associated with the outer of the dual wheels and removed from the wheel location so as to provide free access of air to the brake drum for ventilating and cooling the same, and also allowing ready access to the braking mechanism without disturbing the wheel relationship.

A still further object of the present invention is to provide means which can be simultaneously actuated with the braking means for insuring locking of the wheels together, and which does not depend for operation upon retarding of one of the wheels, such as is required in connection with certain previous types of construction.

Still another advantage of the present invention is the provision of means which positively locks the two wheels together and which is independent of movement of the braking means for the outer wheel but is separately energized and actuated independently of the braking means. It is of course to be understood that both the braking means and the locking means can receive their actuating force from the same primary pressure developing means, but the action of the two mechanisms is entirely independent.

Other objects and advantages of the present invention will be more apparent from the following detailed description which, taken in conjunction with the accompanying drawing, will disclose to those skilled in the art the particular construction and operation of a preferred form of the invention.

In the drawing:

Figure 1 is a vertical sectional view through a portion of a wheel assembly embodying the present invention; and Figure 2 is a top plan view of an axle arrangement adapted to receive the wheel assembly.

Referring now in detail to the drawing, an axle spindle shaft is illustrated at 5 and comprises a tubular member having the outer end portion thereof swaged down as indicated at 6 to provide bearing seats for the bearings 7, 8, 9 and 10 by which the two wheel spiders 12 and 13 are rotatably mounted at the end of the spindle shaft. Suitable bearing locking means is provided at the end of the spindle 5, as indicated at 14, to mount the bearings in position, and at the inner end of the hub 15 of the inboard wheel there is provided the lubricant seal 16 which may be of conventional design.

The outboard wheel or spider 13 has mounted around the hub portion 17 thereof, and intermediate the two wheel spiders 12 and 13, an annular ring member 18 having a circumferential series of apertures 19, described more in detail in my copending application referred to above. The ring is secured to the spider 13 by means of recessed studs 20.

Mounted for axial movement through the portion of the wheel spider 12 intermediate the hub 15 and the spokes are a plurality of plungers 22 which are guided by means of suitable bushings for axial movement in the spider 12 and are secured at their inboard ends to an annular ring or pusher plate 23, there being a spring 24 interposed between the plate and the inboard wall of the spider 12 about each of the plungers, normally tending to retract the plungers toward the inboard side of the spider 12. The plungers 22 have their outboard ends chamfered and are adapted, when moved to the right in Figure 1, to engage in the apertures 19 for locking the spiders 12 and 13 for conjoint rotation. In their normal retracted position, the outboard ends of the plungers 22 are disposed within the spider 12, and consequently the two wheels are arranged for independent relative rotation about the spindle 5.

An annular actuating ring 25 is mounted for sliding movement on the cylindrical portion 26 of the spindle 5, and is adapted to be engaged by oppositely disposed plungers 27 extending into diaphragm housings 28, the inner ends of the plungers 27 being engaged by flexible diaphragm members 29. Suitable spring means 30 normally retains the plungers 27 in retracted position, and inasmuch as the plungers are secured to the ring 25, the springs 30 move the ring 25 when there is no pressure on the diaphragm 29 into the position shown in Figure 1. The diaphragm housing 28 is provided with a port 32 through which fluid under pressure may be admitted to the diaphragm chamber, moving the diaphragm from the position shown, and consequently moving the plungers 27 and actuating ring 25 against the plate 23. This forces the plungers 22 into locking engagement in the ring 18 of the outboard spider 13.

The housing 28 is secured by means of bolts 33 to a flange 34 of a cylindrical tubular casting 35 pressed onto the spindle 5 and terminating at the end removed from the flange 34 in a spring pad or spring seat 36. The member 35 may be secured to the spindle 5 against axial movement by welding or the like, as indicated at 37, and thus is non-rotatably mounted in position on the spindle. Suitable longitudinally extending springs are adapted to support the vehicle body by engagement on the spring seat 36 in a more or less conventional manner. The casting 35 is also provided with transversely extending arm portions 38 terminating at their ends in boss portions 39 adapted to receive cross tubes 40 connecting the two axle spindles 5 at opposite sides of the vehicle rigidly together. This construction is shown in detail in the copending application of Burton L. Mills, Serial No. 272,085, filed May 6, 1939, Patent No. 2,266,061, issued December 16, 1941, and so far as the present invention is concerned, needs no further description herein.

Mounted at the inboard end of the spindle 5 is a brake flange 42 rigidly secured to the spindle end by welding or the like, and adapted to have secured thereto the radially extending backing plate 43 carrying suitable braking means indicated generally at 44. This brake means may be of the fluid actuated type and may be connected to the same source of fluid pressure as the diaphragm chamber 28, whereby, upon actuation of the fluid pressure, the braking means 44 is energized independently of but simultaneously with the diaphragm 29 so that as the braking means is applied the wheels are simultaneously locked together, although one mechanism can function independently of the other.

The outboard spider 13 has secured to the hub 17 thereof the flanged end 45 of a shaft 46 which extends longitudinally through the spindle 5 and at its opposite end is journalled in the bearing assembly 47. The inboard end of the shaft 46 is splined, as indicated at 48, to receive a brake supporting hub 49 carrying at its outer periphery the brake drum 50 adapted to be engaged by the brake means 44. A suitable nut 52 is threaded over the end of the shaft to hold the brake hub 49 on the shaft, and provides for ready removal of the member 49 and drum 50 in the event that the drum must be replaced or reground.

It will be obvious that with this construction the brake drum 50 is axially spaced from both of the wheel assemblies 12 and 13, and consequently provides for free access of air thereto to ventilate and cool the drum. At the same time, the construction allows entrance between the cross tubes 40 for inspection, removal or replacement of the drum without disturbing the wheel spider 12 and 13. It is to be understood of course that each of the wheel spiders 12 and 13 carries at the outer ends of the spokes thereof suitable tire rims 55.

The provision of the brake drum located at this point has another distinct advantage in that whenever the vehicle is operating there is torque applied to the shaft 46 due to rotation of the wheel spider 13 to which it is secured. Consequently, a power take-off mechanism can be secured to the inner end of the shaft 46 beyond the brake hub 49 for driving a generator, or any other similar device, this mechanism being located between the cross tubes 40, and either one or both of the axle spindle shafts can therefore be employed as an additional power take-off mechanism. The details of such a construction for utilizing this torque are disclosed in my copending application, Serial No. 330,454, filed April 19, 1940.

In the operation of the construction herein disclosed, the wheels 12 and 13 will normally have independent relative rotation so that no tire scuffing is produced due to turning of the vehicle, whereby the wheels turn about arcs of varying lengths. However, when it is desired to apply braking force to the wheels, fluid under pressure is applied to the diaphragm 29 and the brake means 44 simultaneously, thereby locking the wheel spiders 12 and 13 together to rotate as a rigid unit, and also applying braking force to the shaft 46, which force is transmitted to both of the wheels due to their locked engagement.

It is therefore believed apparent that I have provided a novel type of construction in which the brake for an independently rotatable dual wheel construction is connected with the outboard wheel, and is remotely disposed so as to provide easy access and ventilation thereof, with means for locking the two wheels together simultaneously with the application of the brakes.

I am aware that various changes may be made in certain details of the present construction, and I therefore do not intend to be limited except as defined by the scope and spirit of the appended claims.

I claim:

1. In combination, an axle spindle, a pair of axially spaced wheels independently journalled in side by side relation on the outer end of said spindle, means for locking said wheels for conjoint rotation, braking means mounted on the opposite end of said spindle, and a brake drum connected to the outboard wheel by means extending through said spindle and engageable by said braking means.

2. In combination, an axle, a pair of axially spaced wheels mounted independently for rotation about the outer end thereof, axially shiftable means carried in the inboard wheel operable to lock said inboard and outboard wheels together for conjoint rotation, a brake assembly axially spaced inwardly of said wheels on said axle and including a brake drum connected to the outboard wheel.

3. In combination, a tubular axle spindle having a pair of axially spaced wheels mounted at the outer end thereof for relative rotation, means for locking said wheels against relative rotation, braking means disposed on the inboard side of the inner wheel including a brake drum, and means extending through said spindle for connecting said drum to the outer wheel.

4. In combination, a tubular axle spindle, a sleeve pressed thereover intermediate the ends of said spindle having a spring seat, a pair of wheels mounted on said spindle on one side of said sleeve for relative independent rotation, means for locking said wheels together for conjoint rotation, a shaft extending through said spindle and connected at one end to the outboard wheel, a brake drum carried on the opposite end of said shaft, and brake drum engaging means mounted on said spindle on the other side of said sleeve.

5. A trailer axle assembly including an axle spindle, a pair of wheels mounted in side-by-side relation for independent rotation on the outer end of said spindle, a spring seat on said spindle inwardly of said wheels, means carried by the inboard wheel and axially shiftable therethrough toward the outboard wheel to lock said wheels for conjoint rotation, and braking means for the outboard wheel mounted on the inboard side of said spring seat.

6. The axle assembly of claim 5 further characterized in the provision of means for actuating said locking means independently of said braking means.

7. The axle assembly of claim 5 further characterized by the provision of fluid operated means carried on the inboard side of the inboard wheel for actuating said locking means.

8. The axle assembly of claim 5 wherein said braking means includes a shaft extending through said spindle and secured to the outboard wheel, and a brake drum mounted on the inner end of said shaft.

9. In combination, an axle spindle having a reduced outer end portion, a pair of wheels mounted in axially spaced relation for relative rotation about said end portion, means for locking said wheels together for conjoint rotation, a shaft extending through said spindle and having a flanged end secured to the hub of the outboard wheel, bearing means for said shaft in the inboard end of said spindle, said shaft being splined at its inboard end, a brake drum carried by said splined end, and brake drum engaging means mounted on the inboard end of said spindle.

10. In combination, a tubular axle spindle, a pair of wheels, individual bearings mounting said wheels in axial side by side relation for independent rotation on the outer side of said spindle, means for locking said wheels together for conjoint rotation, and independent brake means for locking said outboard wheel against rotation relative to said spindle, said last-named means including a brake shoe supporting plate secured to said spindle, a brake drum disposed adjacent said plate, and means extending through said spindle connecting said drum to said outboard wheel.

11. In combination, a tubular axle spindle, a pair of wheels, individual bearings mounting said wheels in axial side by side relation for independent rotation on the outer side of said spindle, means for locking said wheels together for conjoint rotation, and independent brake means for locking said outboard wheel against rotation relative to said spindle, said last-named means including a brake drum on the inboard side of the inboard wheel, and a shaft extending through said spindle interconnecting said drum and outboard wheel for conjoint rotation.

FREDERICK W. BURGER.